US005395526A

United States Patent [19]

Fujiwara et al.

[11] Patent Number: 5,395,526

[45] Date of Patent: Mar. 7, 1995

[54] SCUM REMOVAL APPARATUS

[76] Inventors: Michihiro Fujiwara; Toshimi Fujiwara, both of 13-37-1006, Mikuni Honmachi 2-chome, Yodogawa-ku, Osaka-shi, Osaka 532, Japan

[21] Appl. No.: 39,299

[22] PCT Filed: Jun. 1, 1929

[86] PCT No.: PCT/JP92/00712

§ 371 Date: Apr. 22, 1993

§ 102(e) Date: Apr. 22, 1993

[87] PCT Pub. No.: WO93/04002

PCT Pub. Date: Mar. 4, 1993

[30] Foreign Application Priority Data

Aug. 22, 1991 [JP] Japan .............................. 3-92364 U
Sep. 19, 1991 [JP] Japan .............................. 3-97582

[51] Int. Cl.[6] .............................. B01D 21/18
[52] U.S. Cl. .............................. 210/525; 210/526
[58] Field of Search .............. 210/122, 523, 525, 526, 210/527

[56] References Cited

U.S. PATENT DOCUMENTS

| | | | |
|---|---|---|---|
| 4,011,164 | 3/1977 | McGivern | 210/525 |
| 4,462,909 | 7/1984 | Kennel | 210/525 |
| 4,728,440 | 3/1988 | van Kuijeren | 210/525 |
| 5,057,219 | 10/1991 | Fujiwara | 210/525 |
| 5,200,079 | 4/1993 | Schwartz et al. | 210/528 |

FOREIGN PATENT DOCUMENTS

| | | |
|---|---|---|
| 58-190406 | 12/1983 | Japan . |
| 59-119393 | 8/1984 | Japan . |
| 62-97691 | 5/1987 | Japan . |
| 62-190692 | 12/1987 | Japan . |
| 63-90496 | 6/1988 | Japan . |
| 354794 | 5/1991 | Japan . |

OTHER PUBLICATIONS

Translation of Japan 58-100406.
Translation of Japan 3-54794.

*Primary Examiner*—Christopher Upton

[57] ABSTRACT

A scum removal apparatus of a trough type including a weir movable in response to a movable element moving within a treatment pool. This apparatus includes an actuating mechanism operable in response to the movable element moving within the treatment pool and a transmission means for driving the weir, in which the transmission means includes a hydraulic pump and a control valve such that, while the actuating mechanism drives the pump, a hydraulic drive machine is driven selectively in one of two directions opposite to each other with the control valve being switched, thereby to selectively float and sink the weir above and below a water surface.

In a different mode of carrying out the invention, the actuating mechanism includes a plurality of cam means each having a series of projections and recesses alternating with each other, said cam means being rotatable about a rotary shaft, and the transmission means is in the form of a mechanical transmission mechanism including the rotary shaft.

The apparatus can be installed requiring a minimized space for installation at one side of the treatment pool and is simple in structure and easy to install.

7 Claims, 15 Drawing Sheets

110a
125
110
111a
111
127
126
128
114
101
112
119
117
102
121
106
104
103
124
123
105
122
120
109

101
102
103
104
105
106
109
110
110a
110b
112
114
115
116
117
120
121
121
122
122a
122b
123
124
125
126
127
128

142
141
110
114
117
140
131
138
139
136
135
131
133
137
132
130
134
109
106
105
131

142
110
141
117
151
153
140
145
143
136
147
150
152
148
146
135
139
137
144
133
138
130
132
109

174
177
175
170
171
172
173
176

SCUM REMOVAL APPARATUS

FIELD OF TECHNOLOGY

The present invention generally relates to a scum removal apparatus for efficiently removing scum floating in a treatment pool and, more particularly, to the scum removal apparatus for collecting and removing the scum with the use of a power delivered by moving elements existing in the treatment pool and without using dedicated power.

BACKGROUND ART

Since a large amount of scum gathers on a water surface in a starting or final settling pool, it is necessary to remove the scum efficiently. In order to remove the scum, the applicant has suggested the following scum removal apparatus.

FIGS. 26 and 27 illustrate the scum removal apparatus S the applicant has previously suggested. In a rectangular settling pool provided with this scum removal apparatus, there is provided a plurality of (for example, four) sprocket shafts 200 having their longitudinal axes oriented across the width of the pool, a pair of sprocket wheels 201 mounted on each of the sprocket shafts 200, and left-hand and right-hand endless chains trained around the respective sprocket wheels 201 of each pair.

The scum removal apparatus is so designed as to be driven by the utilization of some or all of flights 203 secured to the endless chains 202 for drawing and removing the scum (floating matter).

The scum removal apparatus is provided with a trough 205, a guide support sheet 206, a weir 208 and a transmission mechanism 209. The trough 205 is of a generally U-shaped cross-section, top side and a front side of which are opened, and is fixed in position within the pool with its longitudinal direction oriented across the width of the pool.

The guide support sheet 206 is in the form of a generally elongated band of a length corresponding to the length of the trough 205 and is made of rubber material. This guide support sheet 206 is secured to the front side of the trough 205 so as to protrude outwardly therefrom and is capable of bending up and down by the effect of its elastic deformation. The weir 208 is of a generally triangular-sectioned hollow body which may often have a foaming material filled therein. This weir 208 is secured to a front side of the elastically deformable guide support sheet 206 so as to protrude outwardly therefrom and is capable of moving up and down on respective sides of a water surface 207 while being supported by the sheet 206.

The up and down movement of the weir 208 is effected by an actuating mechanism 209.

The actuating mechanism 209 comprises a rotary shaft 210 and a drive arm 211. The rotary shaft 210 extends over the width of the pool while the drive arm 211 is a single arm extending from one end of the rotary shaft 210 in a direction perpendicular thereto. A free end of the drive arm 211 is provided with a cam plate 213 having a cam surface defined at bottom thereof. The cam surface has two cam projections 213*a* and 213*c* and a recess 213*b* delimited between the cam projections 213*a* and 213*c*, all defined on the cam surface. Rollers 214 protruding from one end of the flights 203 (movable members) are used to move the cam plate 213 to drive the drive arm 211 and an operating arm 212 so that the weir 208 can be driven up and down through a rod 224 and an operatively associated arm 225. Each of the rollers 214 is secured to a bracket connected to one end of each flight 203 adjacent the earn plate 213.

The operating arm 212 cooperates with the rod 224 and the operatively associated arm 225 to form the transmission mechanism and extends in a direction towards the trough 205, which is counter to the direction of extension of the drive arm 211. This operating arm 212 is employed on each of the left-hand and right-hand sides of the pool.

The above described scum removal apparatus operates in the following manner.

When a motor not shown but installed outside adjacent to the pool is powered, the chains 202 are driven in a direction indicated by an arrow, accompanied by a low-speed circulatory movement of the flights 203 which are disposed on an outer circumference of the chains 202 in a circumferentially equally spaced relationship with each other. These flights 203 serve to drag sediments setting at the bottom of the pool and guide them towards a pit, and the sediments so guided to the pit are discharged out of the pool by a pump not shown. As some of the flight 203 travel upwardly and adjacent the water surface, the associated rollers 214 mounted each end of those flights 203 are successively brought into engagement with the cam plate 213 to shift the latter upwardly.

The rollers 214 are successively brought into contact with the projection 213*a*, then the recess 213*b* and finally the projection 213*c*, causing the cam plate 213 to move up and down. Specifically, when each roller 214 is brought into engagement with the first-stage projection 213*a*, both of the cam plate 213 and the drive arm 211 are lifted a considerable distance while the operating arm 212 is correspondingly lowered, causing the welt 208 to be lowered below the water surface through the rod 224 and the operatively associated arm 225. At this time, scum floating on the water surface, whichever small or large in size, are guided by the action of a flooding motion of water into the trough 205 and is then discharged out of the trough 205.

When the roller 214 is then brought into engagement in the recess 213*b*, both of the cam plate 213 and the drive arm 211 are temporarily lowered while the operating arm 212 is lifted, causing the weir 208 to be shifted upwardly a slight distance with its upper edge brought immediately to a level below the water surface and, accordingly, the amount of water being flooded over the weir 208 is correspondingly reduced. Although the amount of water is reduced, the velocity of flow of water increases conversely and, accordingly, a force necessary to draw the scum acts to a point on the water surface further away from the weir 208 and the scum even at the point further away from the weir 208 is therefore drawn smoothly towards the trough 205.

However, when the roller 214 is finally brought into engagement with the second-stage projection 213*c*, the drive arm 211 carrying the cam plate 213 is gain lifted while the operating arm 212 is lowered, and therefore, the weir 208 is lowered with the consequence that a large amount of scum having been drawn close to the weir 208 is guided into the trough 205. In this way, since the cam plate 213 is of a generally ladder-like configuration, the draw of the scum towards the weir 208 and the subsequent overthrow of the scum into the trough 205 are performed effectively.

The scum removal apparatus S is installed one at each pool and, while the trough 205 in one scum removal apparatus S is installed so as to incline in one direction, the troughs 205 of all scum removal apparatuses S are fluid-connected with each other by means of connecting troughs. The scum and water having flown into one of the troughs 205 which is positioned at the highest level with respect to the direction of downward inclination flow by gravity to the final trough 205 at the lowest level through the intermediate trough or troughs 205 via the associated connecting trough or troughs. The scum and the water having flown into the illustrated intermediate trough 205 then flows into the next succeeding trough 205 through the corresponding connecting trough at the lower level with respect to the direction of downward inclination and are then discharged out of the treatment pool at the lowest level. It is to be noted that each connecting trough is fixed in position with its opposite ends communicated with respective holes formed in portions of walls of the neighboring pools.

Since the scum removal apparatus S is of a type wherein the up and down movement of the cam plate 213 is induced so that the up and down movement of the cam plate 213 can result in an up and down movement of the weir 208, the rotary shaft 210 is required to extend generally across the width of the pool and, since the weir 208 is supported elastically by the guide support sheet 206 made of rubber material, the number of the operating arms 212 extending between the rotary shaft 210 and the weir 208 is not one, but two. With this structure, the drive arm 211, the rotary shaft 210 and the operating arms 212 spread in a plane and, therefore, not only does it bring about an increased cost of manufacture, but also a large-scale construction work is required to make them extend from one end to the other of the pool, resulting in the construction at the site taking a large amount of man power and that of time.

Also, since the cam plate 213 is used to produce the up and down movement necessary to drive the drive arm 211 upwardly a considerable distance, there is a possibility that, if there is a ceiling above the pool, the cam plate 213 may contact the ceiling and, therefore, a manufacturer may find a difficulty in accommodating the request made by the user.

Accordingly, the present invention has been developed to provide a scum removal apparatus which is substantially free from the problems inherent in the conventional scum removal apparatus, which can be manufactured compact and at a reduced cost, and which can be easily installed.

DISCLOSURE OF THE INVENTION

The scum removal apparatus according to the present invention comprises a trough opening upwardly and frontwardly, said trough being fixedly supported adjacent a water surface in a treatment pool with the frontwardly oriented opening of said trough positioned below the water surface, said pool being provided with at least one movable element, and a weir capable of selectively floating above and sinking below the water surface for drawing close towards the trough and damming scum afloat on the water surface, respectively, and is characterized in that said treatment pool includes an actuating mechanism adapted to be repeatedly driven in response to a movement of the movable element within the treatment pool, and a transmission mechanism for driving the weir in response to the drive of the actuating mechanism, said transmission mechanism including a hydraulic pump adapted to be driven by said actuating mechanism, a hydraulic drive machine for driving the weir, and a control valve for selectively switching the hydraulic drive machine in one of first and second directions as a result of being switched by the actuating mechanism, and in that said actuating mechanism drives the hydraulic pump and also switches the control valve so that the hydraulic drive machine can be driven in one of two directions opposite to each other to cause the weir to selectively float above and sink below the water surface.

The present invention is also characterized in that, in the above described scum removal apparatus, said actuating mechanism is a mechanism including a plurality of cam means each having a series of projections and recesses alternating with each other and a member associated with the cam means, said cam means being arranged along a path through which said movable element moves, and said member being rotated around a rotary shaft which is rotatable about an axis aligned with the direction of movement of the movable element in response to the movement of the movable element.

In the above described scum removal apparatus, said transmission means is characterized in that it comprises a mechanical transmission mechanism including the rotary shaft. In this scum removal apparatus, said transmission mechanism is characterized in that it comprises a device utilizing a hydraulic pressure.

BEST MODE FOR CARRYING OUT THE INVENTION

To describe the present invention in more detail, reference will be made to the accompanying drawings.

Figure 1:
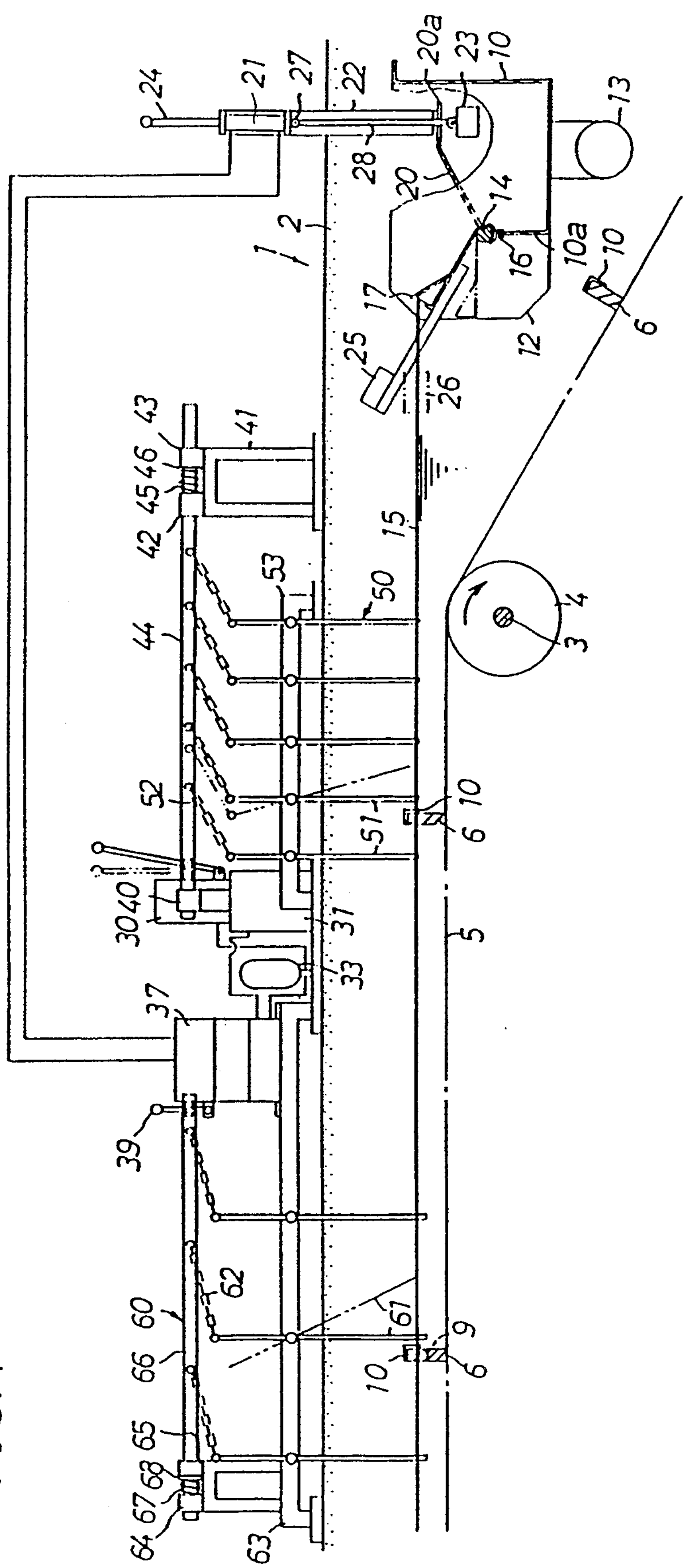
FIG. 1 is a diagram showing the entire apparatus according to one embodiment of the present invention.
Figure 2:
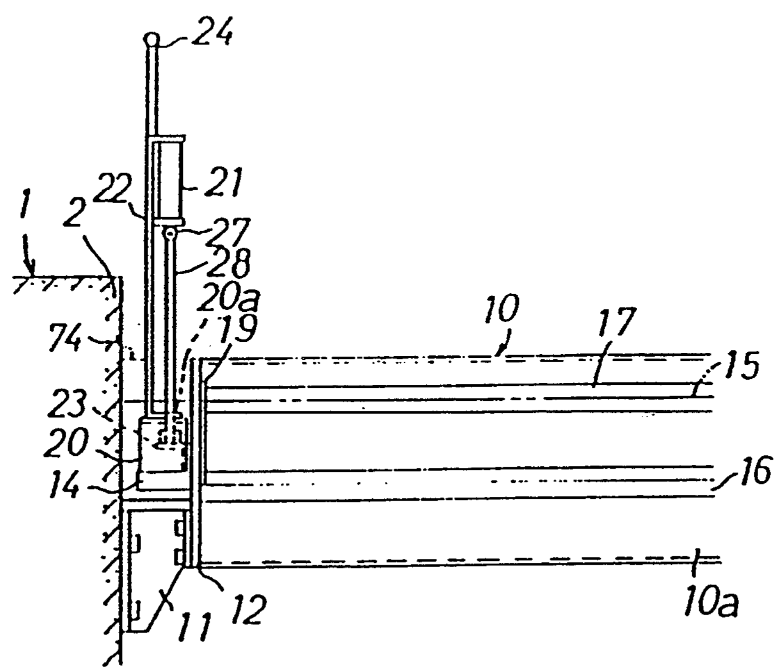
FIG. 2 is a front elevational view showing one end portion of a trough.
Figure 3:
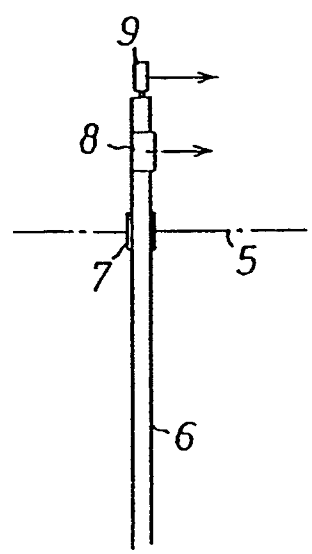
FIG. 3 is a plan view of a flight.

FIG. 1 to FIG. 4 illustrate one embodiment of the present invention. In this embodiment, reference numeral 1 represents a starting or final settling pool (treatment pool). This settling pool 1 when viewed from above represents a generally rectangular shape, and reference numeral 2 represents a side wall extending in a lengthwise direction of the pool 1. Within this settling pool 1, there is provided a plurality of rotary shaft 3 and a pair of sprocket wheels 4 mounted on opposite ends of each rotary shaft 3, left-hand and right-hand endless chains 5 being trained around the sprocket wheels 4 on each of the rotary shaft 3. The endless chains 5 carry a plurality of flights 6. FIG. 3 illustrates a portion of each flight 6 as viewed from above, and the respective flight 6 is provided with a chain bracket 7 to which the associated chain 5 is connected and is also provided, at a portion adjacent one end thereof, with a shoe 8 adapted to be slidingly guided along a guide rail (not shown) at a lower circumference thereof. One end of the flight 6 is provided especially with a roller 9 through a bracket (not shown) for the scum removal apparatus of the present invention. Only this roller 9 is provided on a left-hand side with respect to the direction of travel of the flights 6, but both of the chain bracket 7 and the shoe 8 are provided symmetrically on left-hand and right-hand sides.

At one end the settling pool 1 with respect to the longitudinal direction thereof, there is disposed a generally U-sectioned trough 10 extending transversely of the longitudinal direction of the pool 1 and having its opposite ends secured to the opposite walls of the pool 1 by means of corresponding brackets 11. The trough 10 has its top and a front upper portion both opening, and also has its opposite ends to which respective side plates 12 are secured so as to protrude frontwardly away (left side of FIG. 1) from the respective trough 10. The front upper opening of the trough 10 is positioned below a water surface 15 within the pool 1. This trough 10 is perforated at its bottom wall in communication with a conduit 15 positioned below the trough 10 for the discharge of scum out of the pool 1. A support shaft 14 of a length slightly greater than the length of the trough 10 is rotatably supported between the side plates 12. A gap between the support shaft 14 and a front wall 10*a* of the trough 10 is closed by a seal 16.

A generally triangular-sectioned hollow float (weir) 17 has a base rigidly secured to the support shaft 14 and is rotatable. This float 17 extends a length between the side plates 12, and a side seal 19 is provided between a side face of the float 17 and the side plates 12 for sliding movement together with the side plates 12. The float 17 is capable of selectively floating above the water surface 15 and sinking below the water surface 15 to draw and dam the scum, respectively.

The support shaft 14 has its opposite ends extending outwardly from the opposite ends of the trough 10, one (or both) of said ends of the support shaft 14 having a bent support arm 20 rigidly mounted thereon. This arm 20 has its free end formed with a slot 20*a*.

Above the free end of the support arm 20 is fitted a generally U-shaped cylinder bracket 22 extending vertically and having upper and lower ends provided with horizontally extending projections. The projection at the lower end of the bracket 22 is also formed with a slot while the upper end of the bracket 22 has a double-acting cylinder (hydraulic drive machine) 21 mounted thereon. A rod 27 extending downwardly from the cylinder 21 is coupled through the above described slot with a transmission rod 28 rotatably supported by a bracket 23 secured to an outer surface of one of the side plates 12 of the trough 10. It is to be noted that a manually operable lever 24 is provided on an upper end of the cylinder bracket 22 and that on the float 17 is mounted an auxiliary float 25 which moves up and down with respect to the water surface 15. In place of the auxiliary float 25, an auxiliary float 26 of a type which ride on the float 17 when the latter is lowered may be placed afloat the water surface 15.

Figure 4:
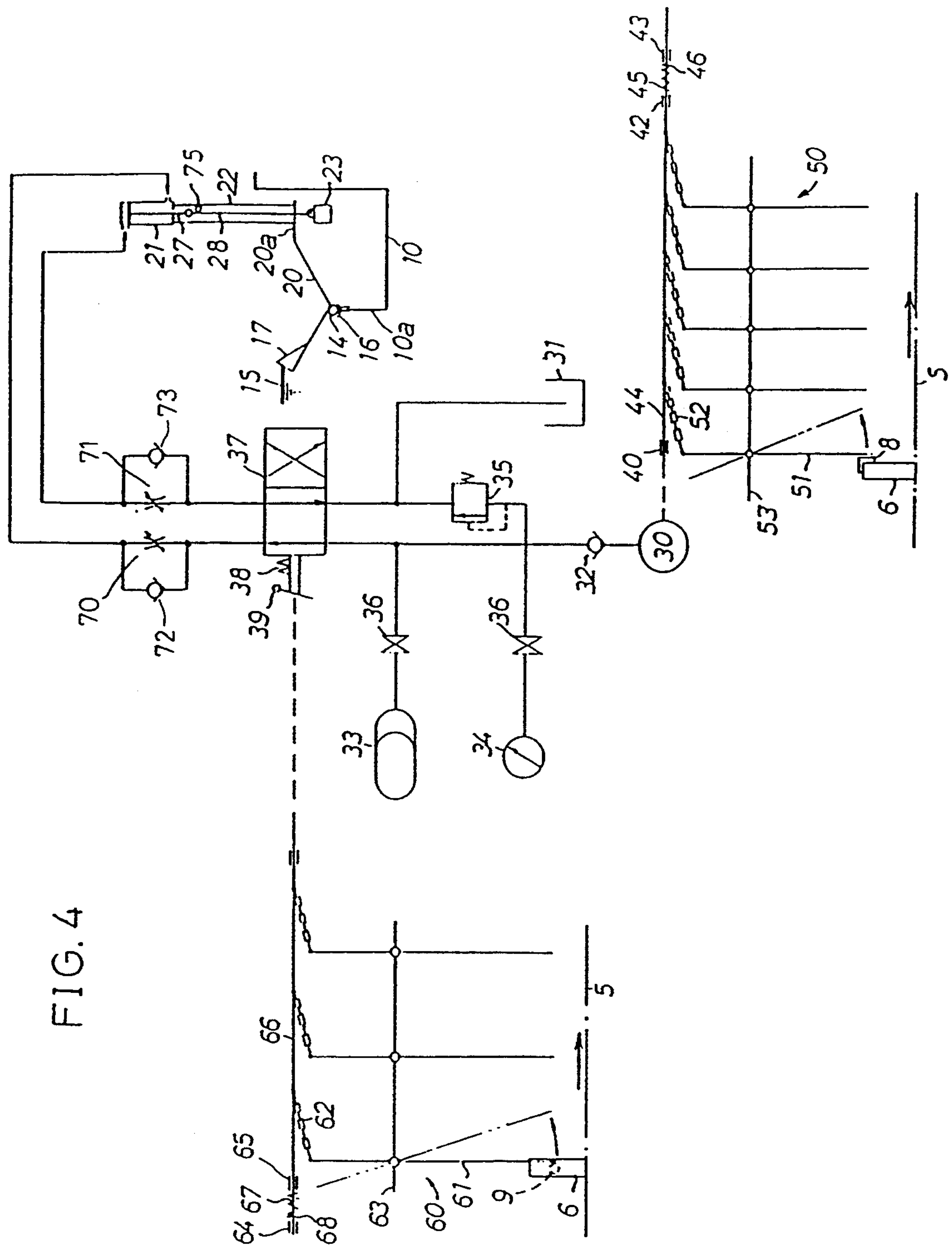
FIG. 4 is a system diagram showing a hydraulic circuit.

Reference numeral 30 represents a hydraulic pump installed alongside the pool 1 and is mounted above a tank 31 serving as a support bench. This hydraulic pump 30 is of any commercially available model and is of a manually operated type having a manually operable lever 30*a* and, by reciprocatingly moving the manually operable lever 30*a*, oil can be pumped from the tank 31. As shown in FIG. 4, reference numeral 32 represents a check valve operable to allow an accumulator 33 to accumulate oil under pressure. Reference numeral 34 represents a pressure gauge, reference numeral 35 represents a relief valve, and reference numeral 36 represents a shut-off valve. Reference numeral 37 represents a hydraulic pressure control valve which is of a two-position closed cross type and is provided with a return spring 38 and a switching lever 39.

A bearing 40 is mounted atop the tank 31, and two bearings 42 and 43 are also rigidly mounted on a support frame 41. A first shaft 44 for actuating the manually operable lever 30*a* is mounted on these bearings 40, 42 and 43 for reciprocal movement in a direction lengthwise thereof. Between the bearings 42 and 43, there is provided a first return spring 45 and a spring seat 46. A plurality of first actuating mechanisms 50 extending a lengthwise direction thereof are mounted on a support frame 47. This mechanism 50 is comprised of a plurality of first lever 51 and a corresponding number of link chains 52. The first levers 51 are sequentially pivoted in contact with some of the shoes 8 as they rotate, pulling the associated link chain 52 to move the first shaft 43 so that the hydraulic pump 30 can be driven in a direction required to pump the oil from the tank 31. Return of the first shaft 43 in the opposite direction is effected by the action of the return spring 44. Since the reciprocal motion of the first shaft 43 is successively effected as the shoes 8 rigid with the flight 6 are sequentially brought into contact with the levers 51, the hydraulic pump 30 can be repeatedly driven to generate the hydraulic pressure. The hydraulic pressure so generated is subsequently accumulated in the accumulator 33.

Reference numeral 60 represents a second actuating mechanism including a plurality of second lever 61 and a corresponding number of link chain 62, and a second shaft 66 extends through two bearings 64 and 65 rigidly mounted on a support frame 63. A second return spring 67 and a spring seat 68 are provided between the bearings 64 and 65 and around the second shaft 66. This second shaft 66 is operatively associated with the switching lever 39 of the hydraulic pressure control valve 37 to actuate the latter. The second levers 61 are sequentially pivoted in contact with the rollers 9 mounted on the flight 6.

Reference numerals 70 and 71 represent left-hand and right-hand throttle valves, and reference numerals 72 and 73 represent left-hand and right-hand variable check valve, each circuit being communicated with an associated outlet of the control valve 37.

The shoe 8 on each of the flights 8 when brought to a position immediately below the first levers 51 pivots the first levers 51 successively as shown by the phantom lines. As the first levers 51 are sequentially pivoted, the associated link chains 52 are pulled to move the first shaft 44 leftwards as viewed in the drawing to actuate the lever 50*a* so that the hydraulic pump 30 can generate an oil pressure which is subsequently accumulated in the accumulator 33. When the control valve 37 is held in a straight position as shown in FIG. 4 (when no second lever 61 contact the roller 9), the hydraulic pressure is handled by the relief valve 35. At this time, the float 17 is held afloat the water surface 15.

When the roller 9 is brought into abutment with each second lever 61, the second shaft 66 is pulled through the associated link chain 62, causing the switching lever 39 to change its position. Consequently, the control valve 37 is switched onto a cross position to allow the hydraulic pressure to be supplied to the upper end of the cylinder 21 through the right-hand check valve 73. Therefore, the cylinder 21 is operated to cause the rod 27 to be extended together with the transmission rod 28 and, by a reaction thereof, the cylinder bracket 22 provided with the cylinder 21 is rocked forwards with the bracket 23 serving as a receiving member. At the same time, the support arm 20 is shifted upwardly as well and the float 17 is lowered below the water surface 15. It is to be noted that the lowering of the float 17 takes place slowly as the left-hand throttle valve 70 acts.

When the roller 9 subsequently moves past the second lever 61, the control valve 37 is returned to a straight position by the action of springs 67 and 38. As a result of this, the hydraulic pressure is supplied from the lower end of the cylinder 21 through the left-hand check valve 72, causing the rod 27 to be retracted together with the transmission rod 28 and, hence, the support arm 20 returned having been rotated clockwise with the bracket 23 serving as a fixed receiving member thereby to cause the float 17 to float on the water surface 15. This floating of the float 17 takes place slowly because the right-hand throttle valve 71 acts. During this time, the shoe 8 on each flight 6 actuates the first levers 51 one after another and, therefore, the hydraulic pressure is progressively generated from the hydraulic pump 30. It is to be noted that, when the float 17 lowers, the lowering of the float 17 is limited to a constant value as the auxiliary float 25 (FIG. 1) acts and by the action of the relief valve 35 and, therefore, no excessive lowering of the float 17 occur.

It is to be noted that, since as shown in FIG. 2 a gap is formed between the wall of the pool 1 and each end of the trough 10, a sealing plate 74 is provided at front so as to close the gap. Also, reference numeral 75 used in FIG. 4 represents a look bolt mounted on the bracket 22 so avoid any possible descend of the float 17 when the treatment pool 1 is empty of water or is filled with a small quantity of water and operable to regulate an undesirable extension of the rod 27.

Figure 5:
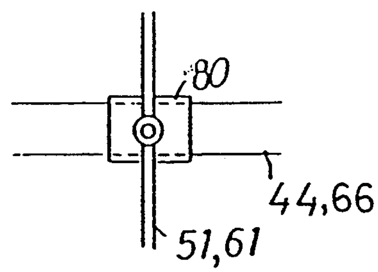
FIG. 5 is a front elevational view of a position adjusting mechanism for a lever.
Figure 6:
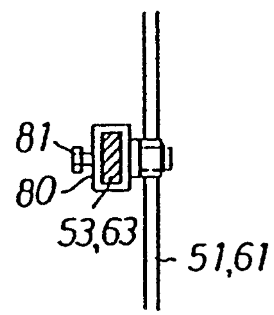
FIG. 6 is a sectional view of the position adjusting mechanism for the lever.

Some modifications will now be illustrated. FIG. 5 and FIG. 6 illustrate an example in which the first and second levers 51 and 61 are made movable horizontally. The shafts 44 and 66 are provided with sliders 80 which can be fixed in position by respective bolts 81. Accordingly, the distance of spacing between each neighboring levers can be changed as desired.

Figure 7:
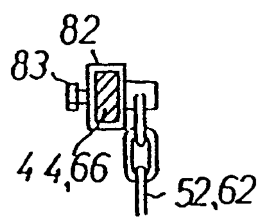
FIG. 7 is a sectional view showing a position adjusting mechanism for a link chain.

FIG. 7 illustrates an example in which the link chains 52 and 82 are fitted movably to the associated shafts 44 and 88 by means of sliders 82 and are fixed in position by means of bolts 83. Accordingly, the distance of spacing between each neighboring levers can be changed as desired.

Figure 8:
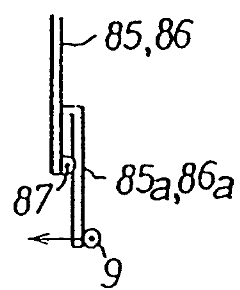
FIG. 8 is a side view showing a bendable lever.

FIG. 8 illustrates an example in which leading levers 85*a* (88*a*) are provided on the first lever 85 (or the second lever 88) so that the leading levers 85*a* (88*a*) can be pivoted about corresponding hinges 87 in one direction so as to make an escapement. With this arrangement, any possible bent or breakage of the lever 85 (88) which would occur when the roller 9 on each flight 6 travels in a reverse direction can be avoided.

Figure 9:
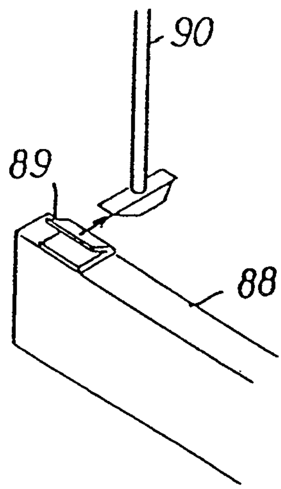
FIG. 9 is a perspective view showing a lever actuating mechanism of a type employing a magnet.

FIG. 9 illustrate an example in which the shoe 89 or the lever 90 for each flight 88 is made of a magnet material so that the shoe 89 and the lever 90 are detachably coupled with each other by the utilization of a magnetism developed by the magnet.

Figure 10:
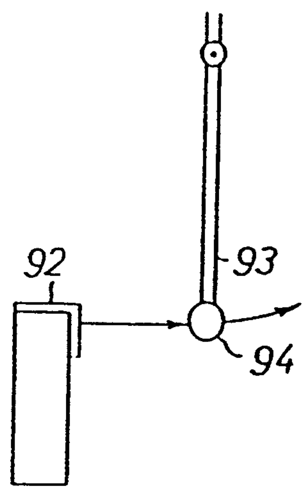
FIG. 10 is a side view of the lever actuating mechanism of the type employing the magnet.

FIG. 10 illustrates a similar example in which a round shaft 94 on the side of the shoe 92 or the lever 93 is constituted by a magnet.

Figure 11:
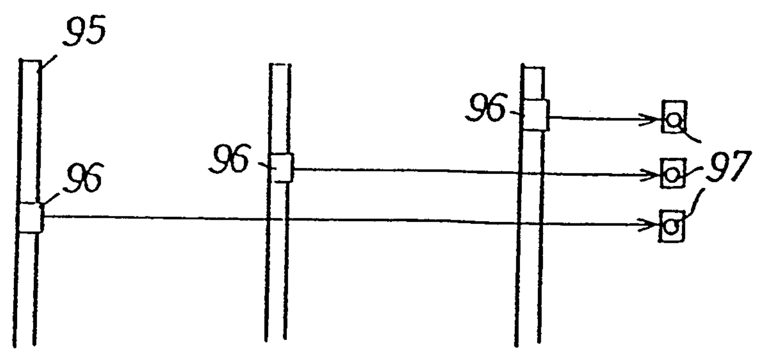
FIG. 11 is a plan view showing another embodiment in which a shoe is displaced in position.

FIG. 11 illustrates an example in which the shoes 98 on the respective flights 95 are laterally offset relative to each other and, in correspondence therewith, the levers 97 are arranged in an offset relationship with each other. According to this arrangement, a removal of, for example, an intermediate shoe 98 from the associated flight 95 can result in a change in operative relationship of the hydraulic pump or the control valve. Conversely, it is possible to increase the operative relationship.

Figure 12:
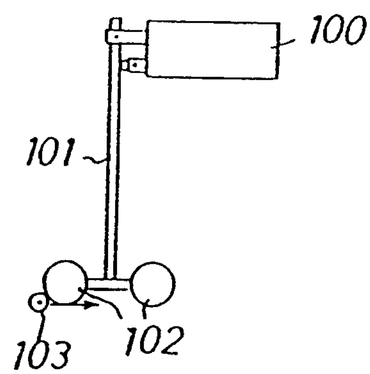
FIG. 12 is a side view showing an embodiment in which the lever is employed in the form of a cam.

FIG. 12 illustrates a system in which a lever 101 for a control valve 100 need not be employed in a plural number. A single lever 101 has a lower end connected with two cams 102 through a round plate or a tube. By allowing each roller 103 to kick the cams 102 several times, the lever 101 need not be employed in a plural number. Nevertheless, the space in which the cams 102 are provided may be made adjustable.

Figure 13:
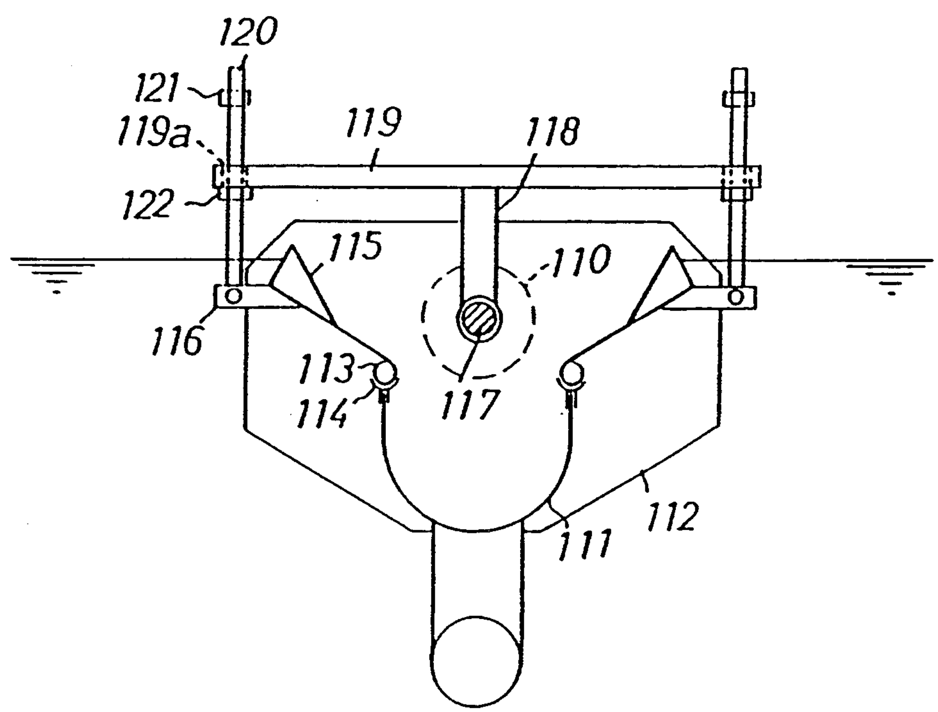
FIG. 13 is a cross sectional view taken along the line A—A in FIG. 14, showing an embodiment in which a rotary actuator is employed for a hydraulic drive machine.
Figure 14:
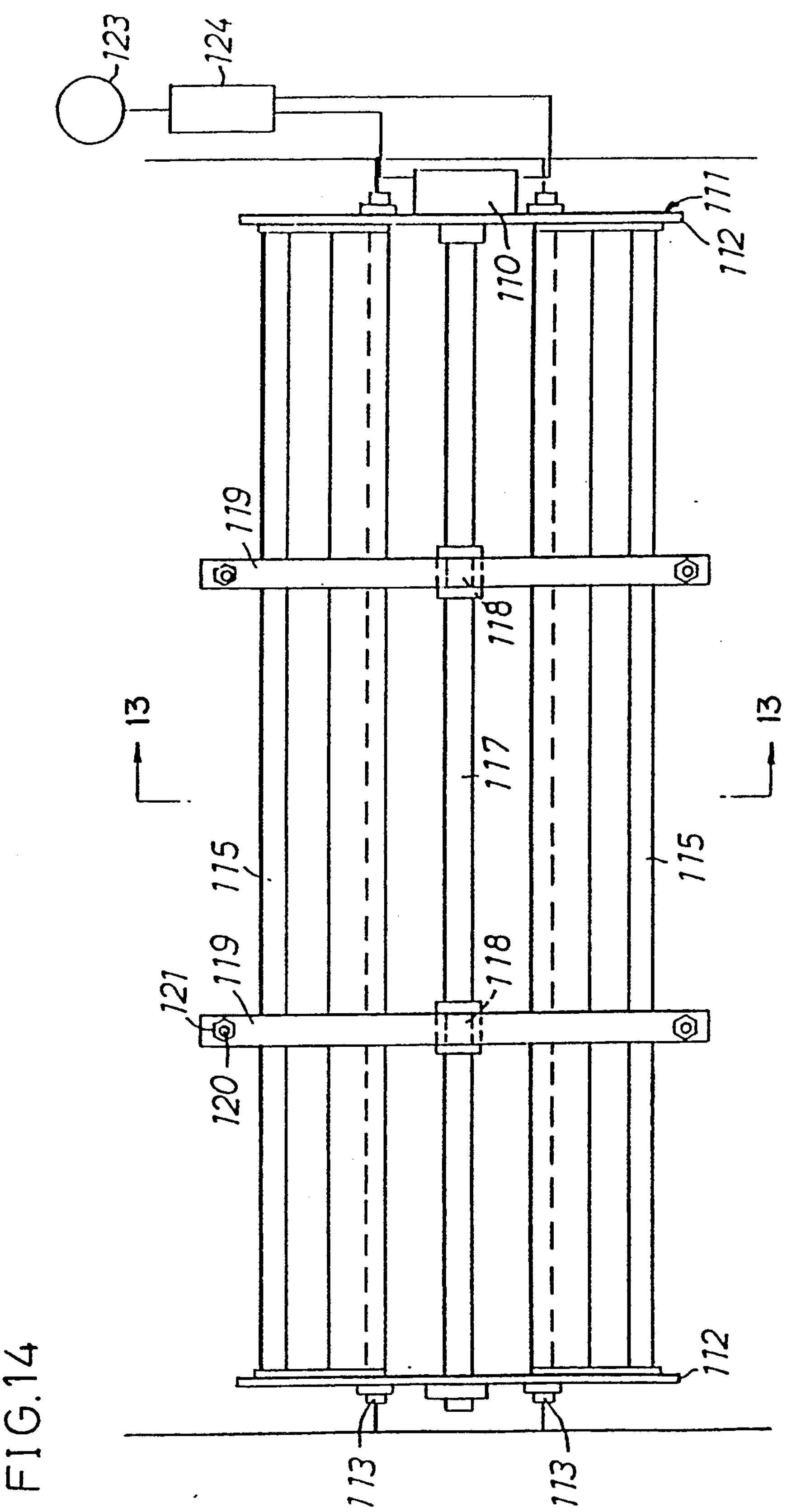
FIG. 14 is a plan view of FIG. 13.
Figure 15:
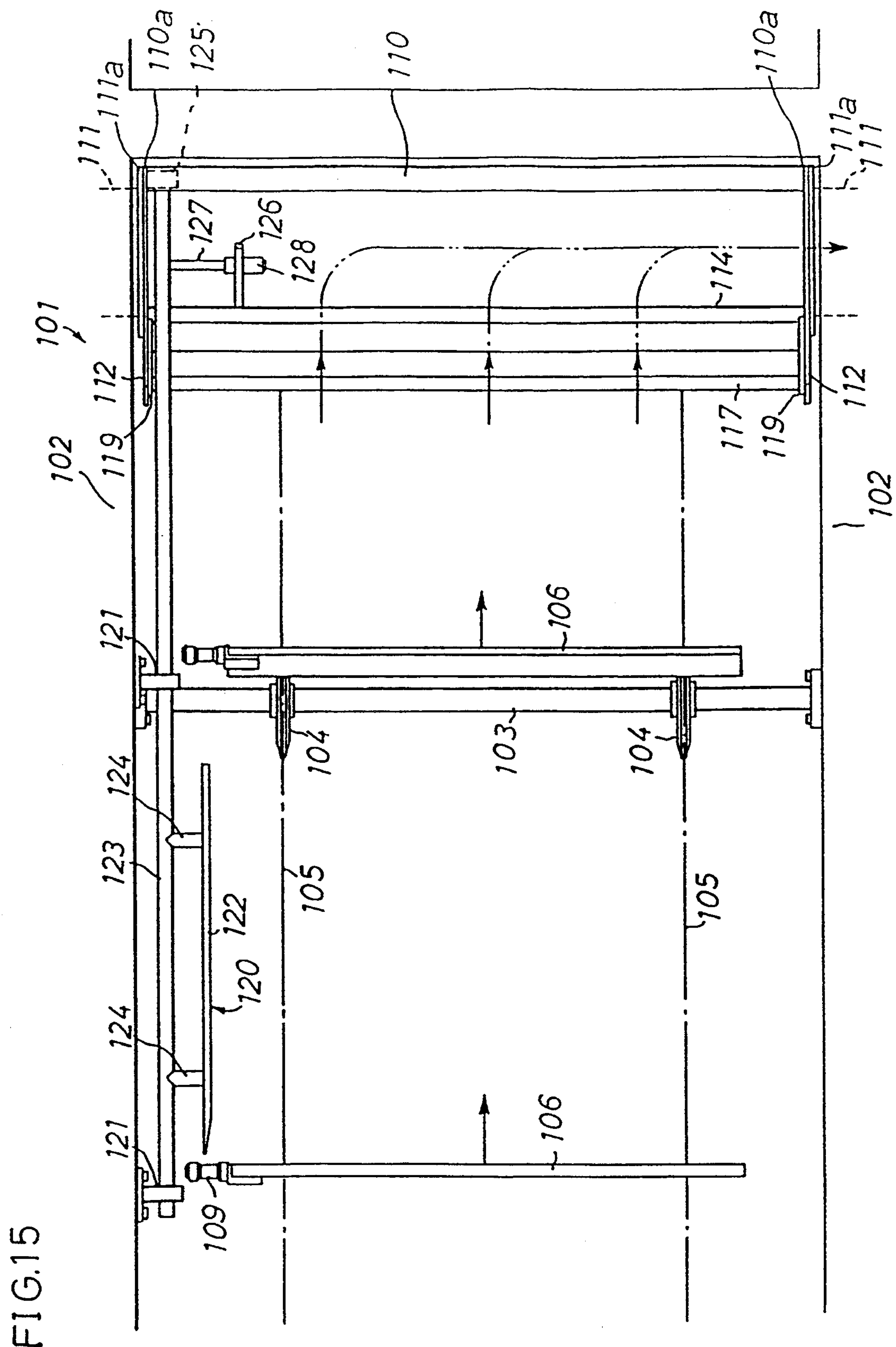
FIG. 15 is a plan view showing the entire scum removal apparatus according to one embodiment of the present invention.
Figure 16:
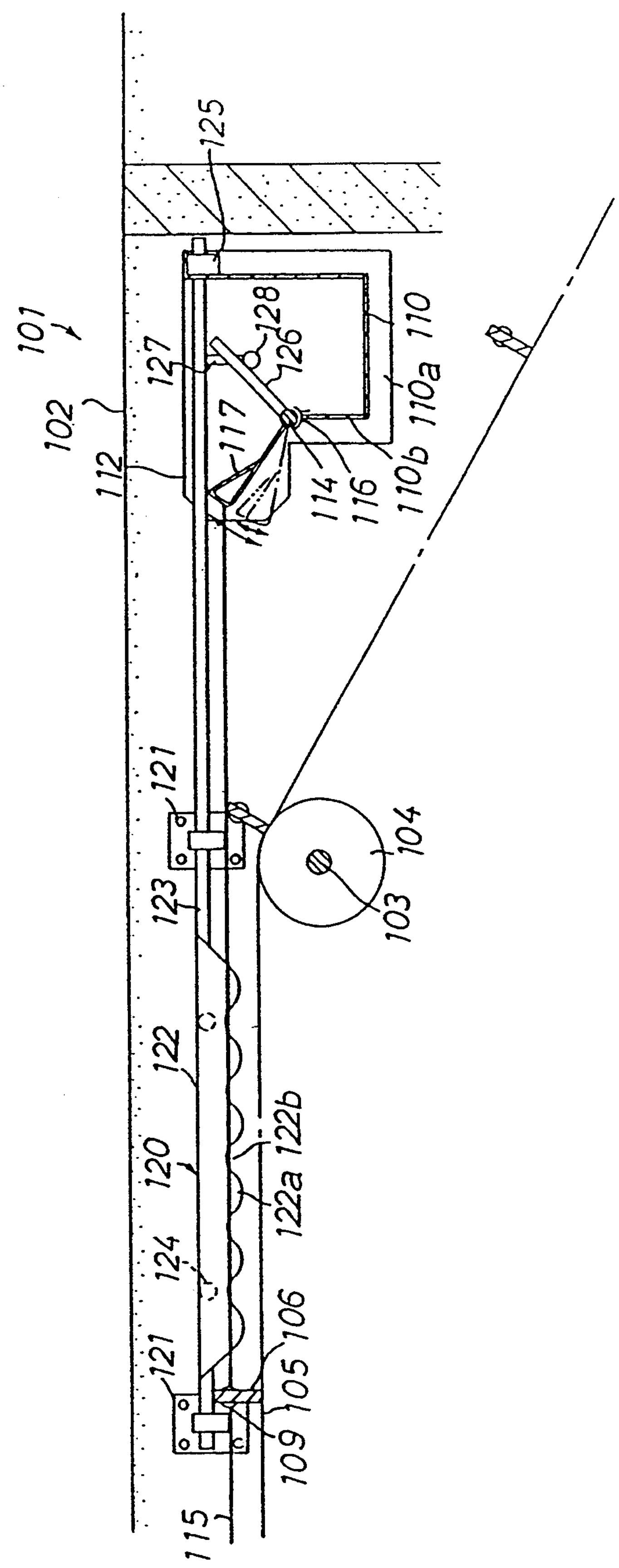
FIG. 16 is a longitudinal sectional view of thereof.

FIG. 13 and FIG. 14 illustrate the use of a different type for the hydraulic drive machine. In other words, the drive machine 110 is a rotary actuator. A trough 111 is in the form of a semi-cylindrical trough having its opposite ends provided with a respective side plate 112 and, between these side plates 112, support shafts 113 and corresponding seals 114 are provided at front (left)

and rear (right). The support shafts 113 is provided with corresponding floats 115 each provided with a pair of left-hand and right-hand arms 116 protruding outwardly therefrom.

On the other hand, a rotary shaft 117 has its opposite ends journalled to the side plates 112, one of said opposite ends of the rotary shaft 117 being drivingly coupled with a drive machine 110. The rotary shaft 117 has two portions longitudinally spaced each other on which respective stays 118 are mounted so as to protrude upwardly. Each of these stays 118 has an operating arm 119 rigidly secured thereto so as to represent a generally T-shaped configuration. Each of the opposite ends of each operating arm 119 is formed into a slot 119*a* in which an associated rod 120 is received while extending therethrough. Each rod 120 has a lower end coupled with the associated arm 116 and has its outer periphery on which nuts 121 and 122 are mounted in axially spaced relationship with each other. The hydraulic drive machine 110 is reciprocatingly driven in one of opposite directions by means of a circuit including a tank 123 and a hydraulic pressure control valve 124. Accordingly, when the drive machine 110 is rotated in one of the opposite direction, the operating arms 119 are rotated in the same direction by means of the rotary shaft 117 until the operating arms 119 are brought: into abutment with the nuts 122 and, thereafter, the rods 120 are lowered, causing one of the floats 115 to be lowered below the water surface. On the other hand, when the drive machine 110 is driven in the other of the opposite directions, the other of the floats 115 is lowered below the water surface while said one of the floats 115 is lifted above the water surface.

FIG. 15 to FIG. 18 illustrate another embodiment of the present invention. In this embodiment, reference numeral 101 represents a starting or final settling pool (treatment pool). This settling pool 101 when viewed from above represents a generally rectangular shape, and reference numeral 102 represents a side wall extending in a lengthwise direction of the pool 1. Within this settling pool 101, there are provided a plurality of rotary shaft 103 and a pair of sprocket wheels 104 mounted on each rotary shaft 103, left-hand and right-hand endless chains 105 being trained around the sprocket wheels 104 on each of the rotary shaft 103. The endless chains 105 carry a plurality of flights 106 spaced an equal distance from each other over the circumference of the endless chains 105. Each of the flights 106 may be made of any material such as wood, plastics or any other suitable material.

Figure 17:
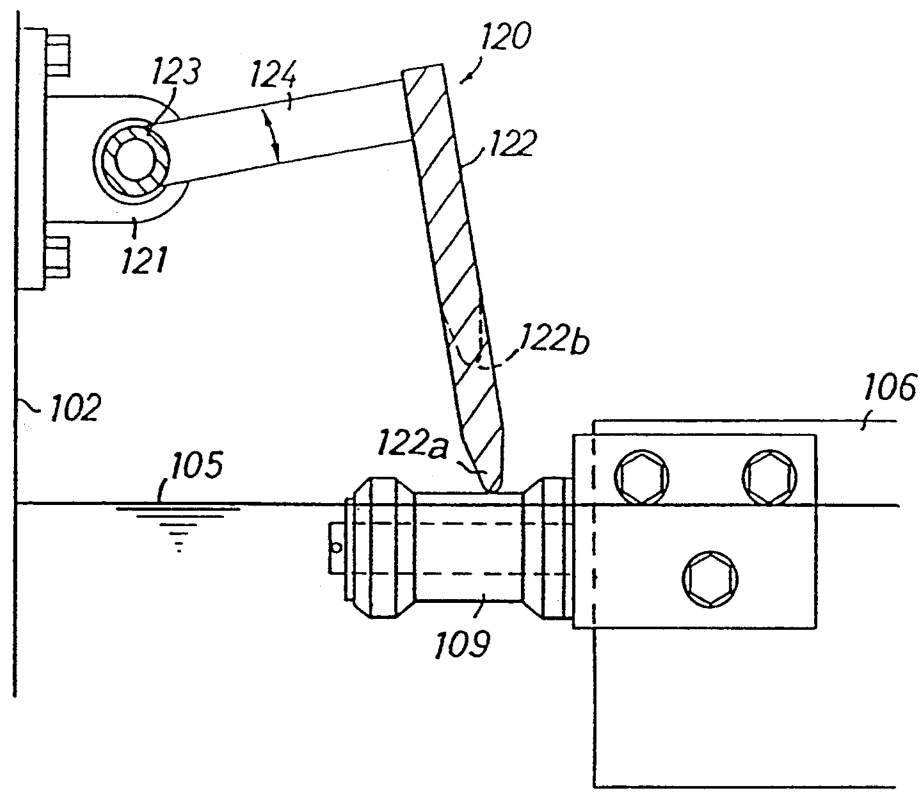
FIG. 17 is a sectional view, taken from front, showing an operative connection between a roller and a cam plate.
Figure 18:
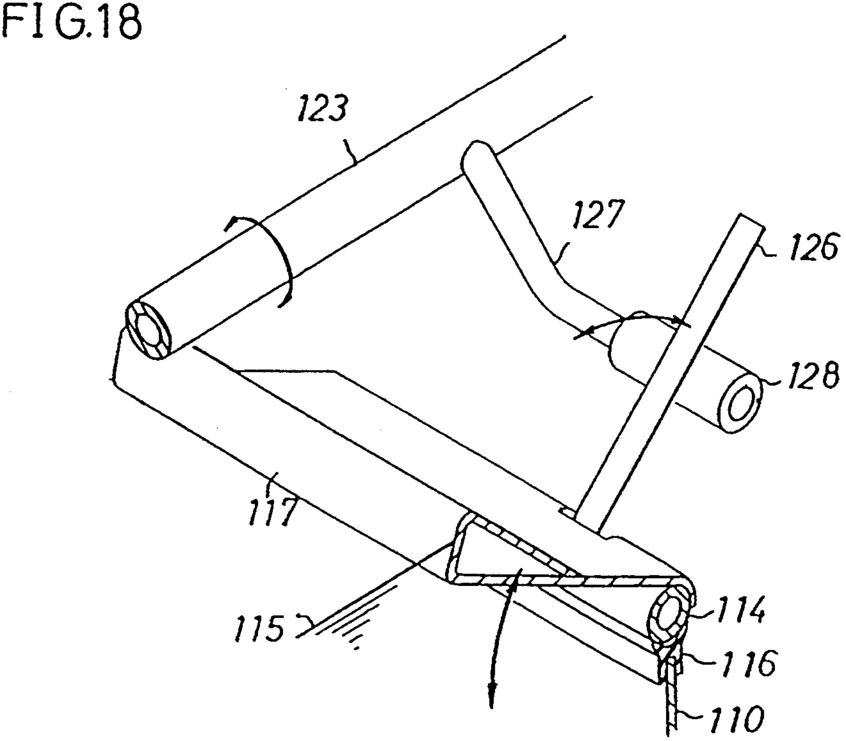
FIG. 18 is a perspective view showing an operative connection between a rotary shaft and a weir.

FIG. 17 illustrates a fragmentary portion of one of the flights 106 and, as shown therein, a left-hand end of each flight 106 with respect to the direction of movement thereof is provided specially with a roller 109 for the scum removal apparatus through a corresponding bracket which is not shown.

At one end the settling pool 101 with respect to the longitudinal direction thereof, there is disposed a generally U-sectioned trough 110 extending transversely of the longitudinal direction of the pool 101. This trough 110 has at its opposite ends flanges 110*a* and 111*a* fluid-connected with respective connecting troughs 111 (FIG. 15) fixed in position by means of brackets while the connecting troughs 111 extend through side walls 102 of the settlement pool 101.

The trough 110 has its top and a front upper portion both opening, and also has its opposite ends to which respective side plates 112 are secured so as to protrude frontwardly away from the flanges 110*a*. The front upper opening of the trough 110 is positioned below a water surface 115 within the pool 101. A support shaft 114 of a length slightly greater than the length of the trough 110 is rotatably supported between the side plates 112. A gap between the support shaft 114 and a front wall 110*b* of the trough 110 is closed by a seal 116.

A generally triangular-sectioned hollow float (weir) 117 has a base rigidly secured to the support shaft 114 and is rotatable. This weir 117 has a length sufficient to extend between the side plates 112, and a side seal 119 fitted to each end face thereof slides along a side face of the trough 110. The weir 117 is capable of selectively floating above the water surface 115 and sinking below the water surface 115 to draw and dam the scum, respectively. It is to be noted that the support shaft 114 is securely supported by bearings fixed to the trough 110, which bearings are not shown.

On the other hand, a mechanism for selectively floating and sinking the weir 117 is so constructed as will now be described.

In the first place, an actuating mechanism 120 includes two brackets 121, a cam plate 122 and a rotary shaft 123. The brackets 121 are secured to one of the opposite side walls 102 and spaced in a direction lengthwise of the settling pool 101, and the rotary shaft 123 is supported by the brackets 121 so as to extend parallel to the side wall 102. This rotary shaft 123 has two support arms 124 extending laterally therefrom and carries a cam plate 122 mounted on the support arms 124.

The cam plate 122 is in the form of a generally elongated plate having its undersurface formed with a series of projections 122*a* and recesses 122*b* alternating with each other. Each of the recesses 122*b* has a deepest portion depressed inwardly to a level lower than the level of an upper end of each roller 109 whereas a lowermost end of each of the projections 122*a* terminates at a level further lower than the lower end of the respective roller 109.

The rotary shaft 123 is in the form of a single elongated shaft extending towards the trough 110 with one end thereof rotatably extending through and supported by a bracket 125 secured to a rear portion of the trough 110. One end of the rotary shaft 123 is provided with a drive lever 127 rigidly connected thereto so as to extend laterally outwardly therefrom for moving up and down a driven lever 126 secured to the support shaft 114. The drive lever 127 has a free end carrying a roller 128. It is to be noted that a lower end portion of the cam plate 122 where the projections and the recesses are formed is tapered and, at the same time a free end of the cam plate 122 is also shaped so as to taper outwardly. A transmission means is constituted by the rotary shaft 123, the drive lever 127 and the driven lever 126.

When each roller 109 is successively brought into contact with the projections 122*a* of the cam plate 122 as the flights 106 undergo a circulatory motion with the rollers 109 successively brought into register with the cam plate 122, the roller 109 shifts upwardly about the rotary shaft 123. Accordingly, the drive lever 127 is shifted upwardly through the rotary shaft 123, accompanied by a corresponding upward shift of the driven lever 126 and, consequently, the weir 117 is lowered considerably below the water surface allowing scum to be drawn into the trough 110 together with water.

When the roller 109 is subsequently brought into the recess 122*b*, the cam plate 122 is lowered about the rotary shaft 123, causing the rotary shaft 123 to be returned a little and, therefore, the weir 117 is mowed with its upper end positioned several centimeters below the water surface. At this time, since the water surface flows at a rapid speed, scum located further away from the trough 110 can be drawn close towards the trough 110 as described hereinbefore and is finally drained into the trough 110. By repeating this cycle, the weir 117 cyclically moves up and down below the water surface, and as the roller 109 moves past the cam plate 122, the rotary shaft 123 returns allowing the weir 117 to be afloat above the water surface 115, thereby interrupting the flow of the scum into the trough 110.

Figure 19:
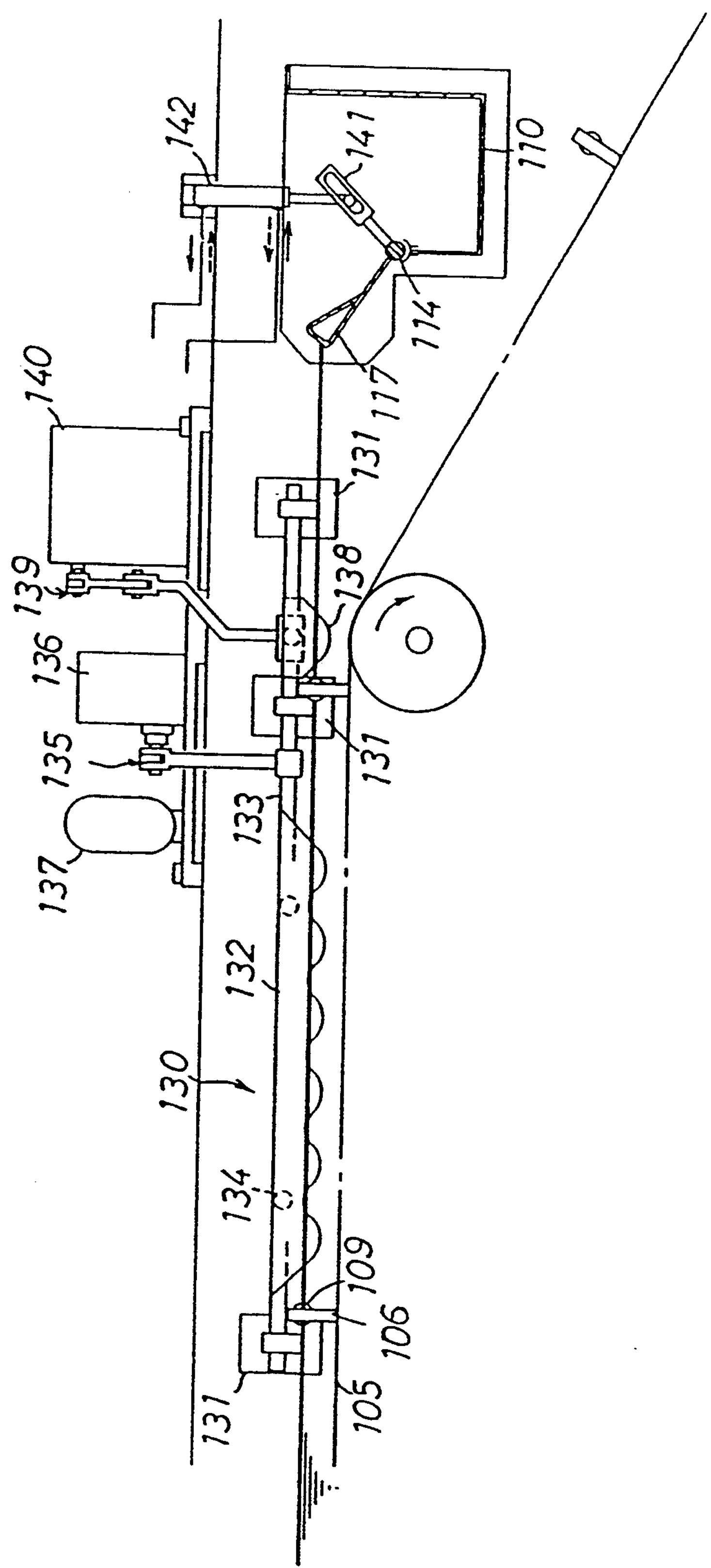
FIG. 19 is a side sectional view showing an embodiment in which a transmission means is constituted by a hydraulic means.
Figure 20:
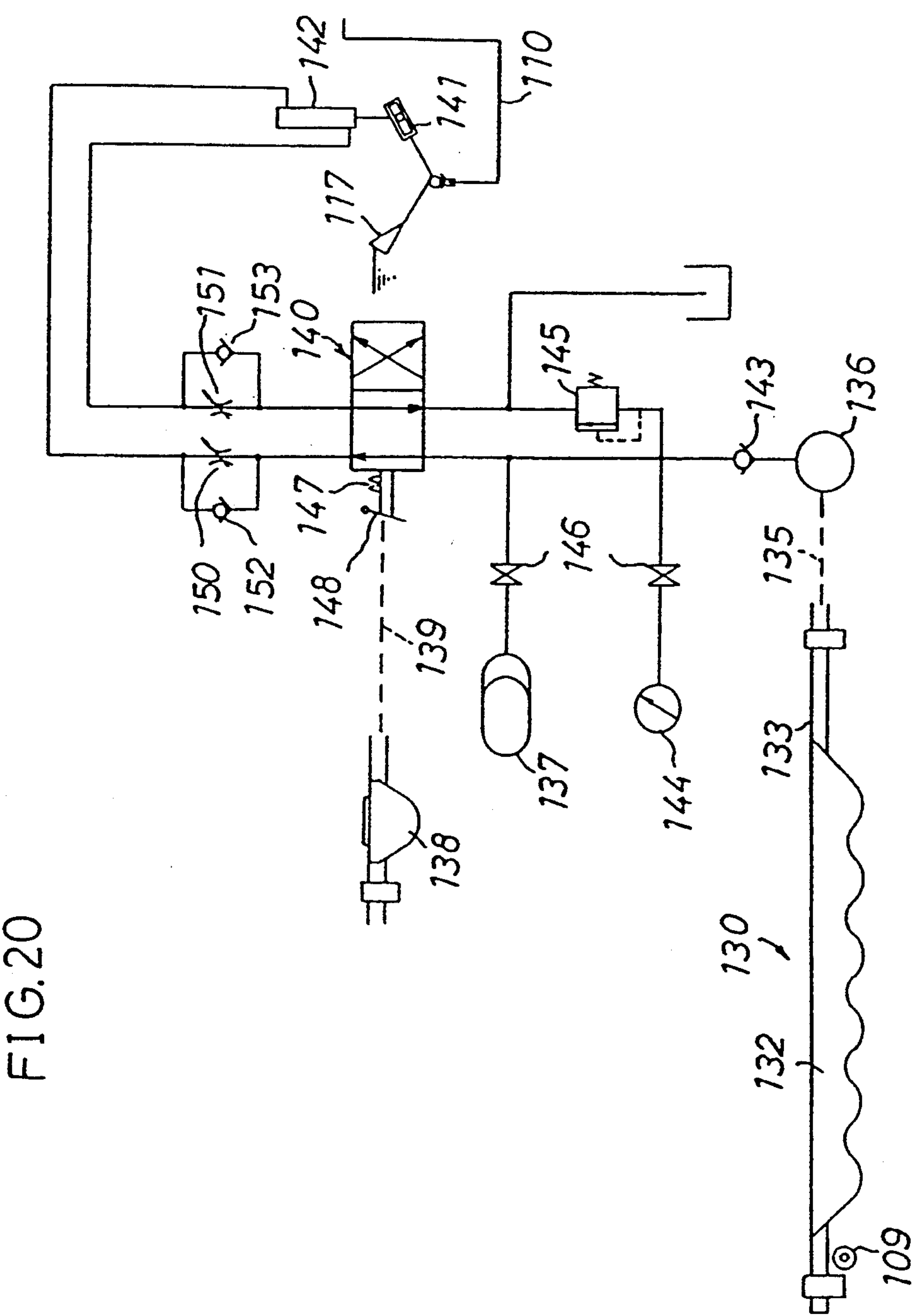
FIG. 20 is a diagram showing a hydraulic circuit thereof.
Figure 21:
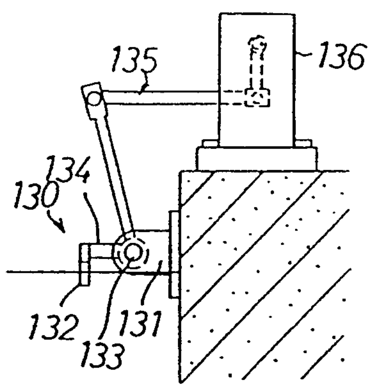
FIG. 21 is a sectional view showing an operative linkage from the cam plate to the link chain.

FIG. 19, FIG. 20 and FIG. 21 illustrate a different embodiment in which a hydraulic pressure (oil pressure) which is a fluid pressure is utilized as a transmission means. In this embodiment, a mechanism for selectively floating and sinking the weir 117 is so constructed as will now be described.

In the first place, an actuating mechanism 130 includes three brackets 131, a cam plate 132 and a rotary shaft 133. The rotary shaft 133 is of a short length and carries the cam plate 132 secured thereto through two spaced apart support arms 134 protruding laterally from the rotary shaft 133. When the cam plate 132 is rotated by each roller 109 about the rotary shaft 133, a hydraulic pump 136 is repeatedly driven through a link mechanism 135 to allow an accumulator 137 to accumulate pressure.

An other portion of the rotary shaft 135 is fitted with a switching cam plate 158 which undergoes a rotatory motion independently of the cam plate 132. When each roller 109 is brought into contact with this cam plate 138, the cam plate 138 is rotated around the rotary shaft 133 independently of the cam plate 132 to switching a hydraulic pressure control valve 140 of two-position closed cross type through a link mechanism 159.

Reference numeral 141 represents a driven lever adapted to be reciprocatingly pivoted by a cylinder 142.

Reference numeral 143 in a hydraulic circuit represents a check valve operable to allow the accumulator 157 to accumulate pressure oil. Reference numeral 144 represents a pressure gauge, reference numeral 145 represents a relief valve, and reference numeral 146 represents a shut-off valve. The control valve 140 is provided with a return spring 147 and a switching lever 148.

Reference numerals 150 and 151 represent left-hand and right-hand throttle valves, and reference numerals 152 and 153 represent left-hand and right-hand variable check valve, each valve being communicated with an associated outlet or inlet of the control valve 140.

When each roller 109 is brought into contact with the cam plate 132, the rotary shaft 133 is repeatedly rotated in the manner described hereinabove and, accordingly, the pump 136 is driven to allow the accumulator 137 to progressively accumulate pressure. When the control valve 140 is in a straight position, the hydraulic pressure is controlled by the relief valve 145. The weir 117 is held afloat on the water surface.

When the respective roller 109 is brought into abutment with the cam plate 138, the control valve 140 is switched onto a cross position through the link mechanism 139, allowing the hydraulic pressure to be supplied to a lower end of the cylinder 142 through the right-hand check valve 153. Accordingly, the weir 117 is lowered below the water surface. It is to be noted that the lowering of the weir 117 takes place slowly as the left-hand throttle valve 150 acts.

When the roller 109 subsequently moves past the cam plate 138, the control valve 140 is returned to the straight position. As a result of this, the hydraulic pressure is supplied to an upper end of the cylinder 142 through the left-hand check valve 152, causing the weir 117 to float upwardly. This floating of the float 117 takes place slowly because the right-hand throttle valve 151 acts. During this time, the accumulator 137 progressively accumulate the hydraulic pressure.

Figure 22:
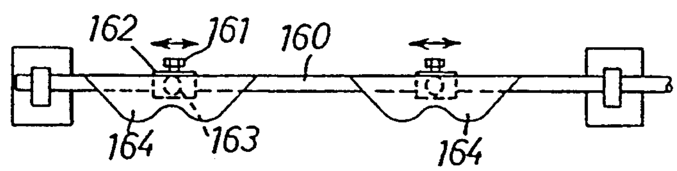
FIG. 22 is a side view showing an embodiment in which the cam plate is of a separable type.

Hereinafter, another modification will be illustrated. As shown in FIG. 22, arrangement may be made that there is provided a plurality of tubes 162 that can be fixed to the rotary shaft 160 by means of bolts 161 while slidably mounted thereon. The support arms 163 are fitted to these tubes 162 with cam plates 164 mounted thereon. The cam plates 164 can be adjustable in position along the rotary shaft 160 and, at the same time, a desired number of the cam plates 164 can be employed. Therefore, the timing of operation can be designed as desired according to demands made by the user.

Figure 23:
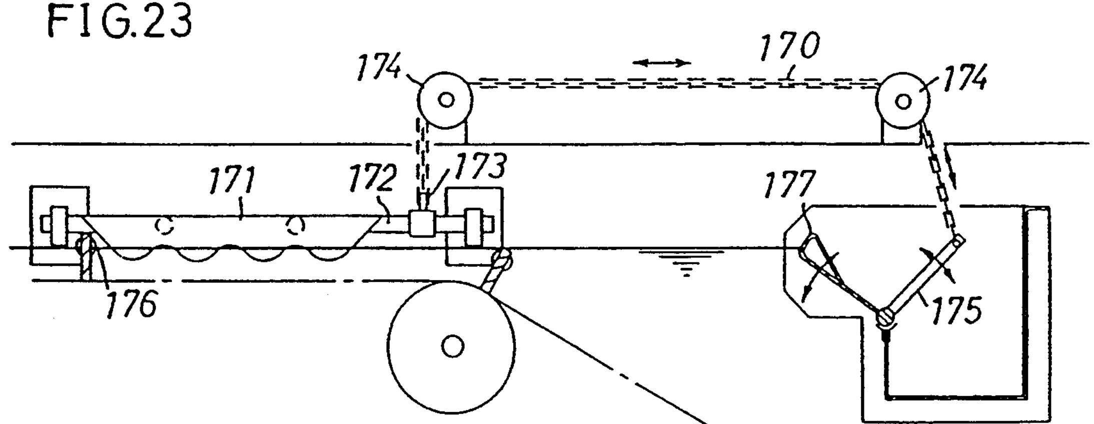
FIG. 23 is a side sectional view showing an embodiment in which the transmission means is employed in the form of a link chain.
Figure 24:
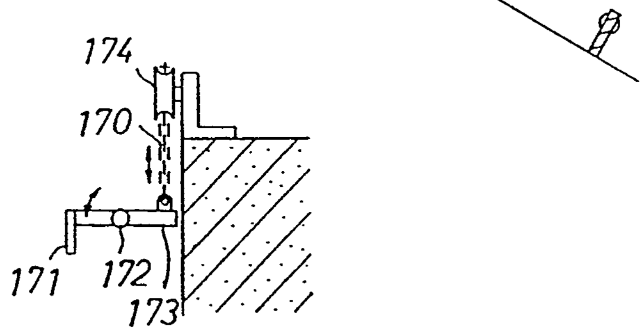
FIG. 24 is a sectional view thereof.

FIG. 23 and FIG. 24 illustrate an example in which the transmission means is constituted by link chain 170. A rotary shaft 172 carrying a cam plate 171 is provided with a lever 173 to which one end of the link chain 170 is anchored. Pulleys 174 are disposed above the pool and the chain 170 is trained around these pulleys 174 with its other end connected to a driven lever 175. Accordingly, when each roller 176 is brought into abutment with the cam plate 171, the chain 170 is pulled downwardly with the driven lever 175 consequently shifted upwardly to lower the weir 177. The depth to which the weir 177 is lowered depends on cam irregularities of the cam plate 171. It is to be noted that the lever 173 may be counteracted with a return stopper.

Figure 25:
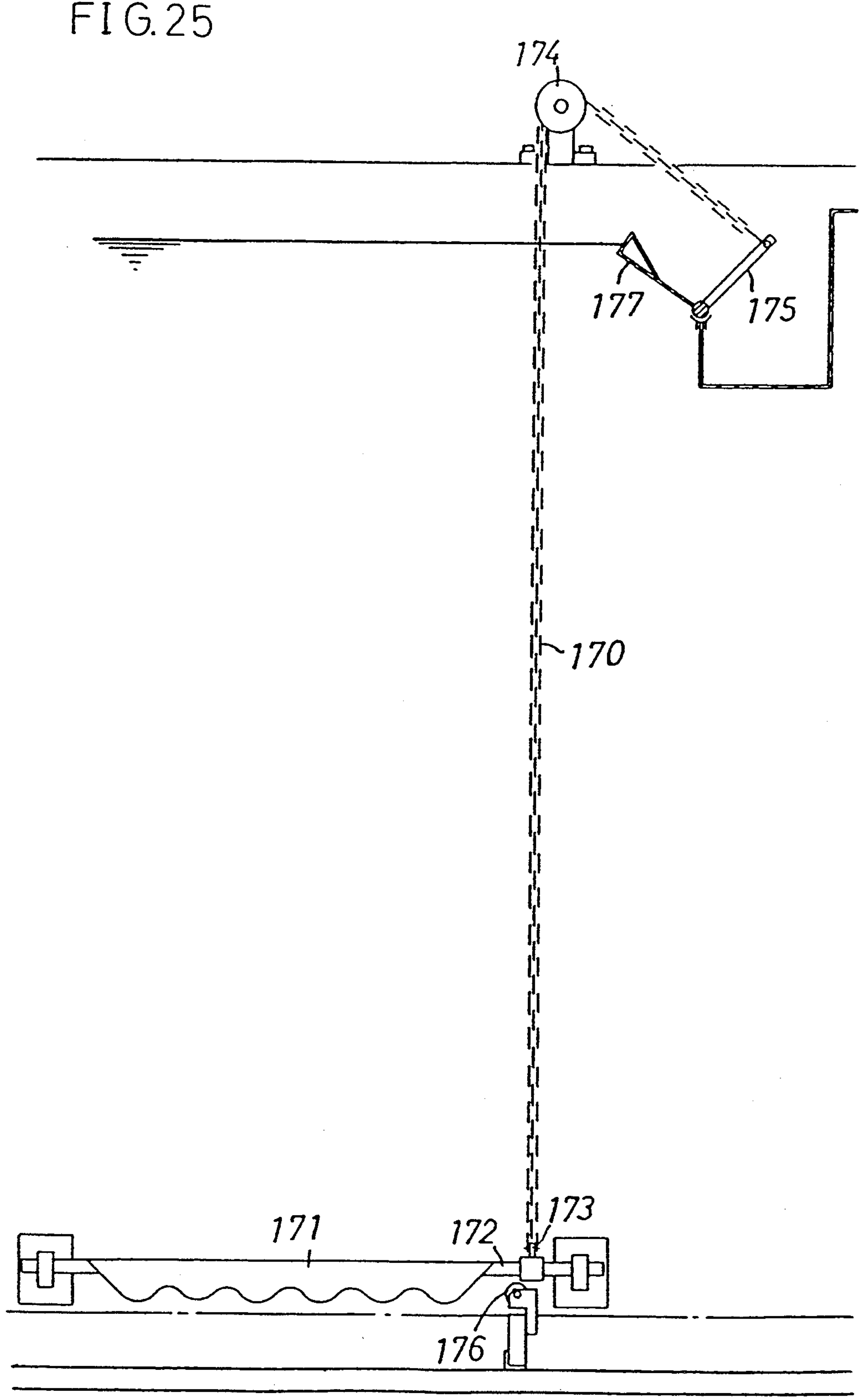
FIG. 25 is a side sectional view showing an embodiment applicable where the settling pool is of a two-story tank design.
Figure 26:
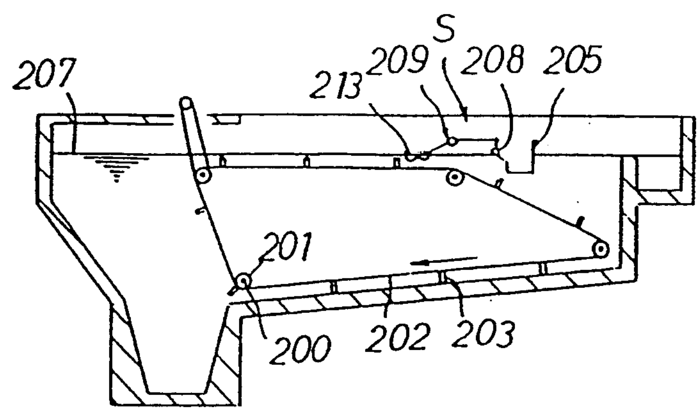
FIG. 26 is a plan view showing an example of the conventional scam removal apparatus.
Figure 27:
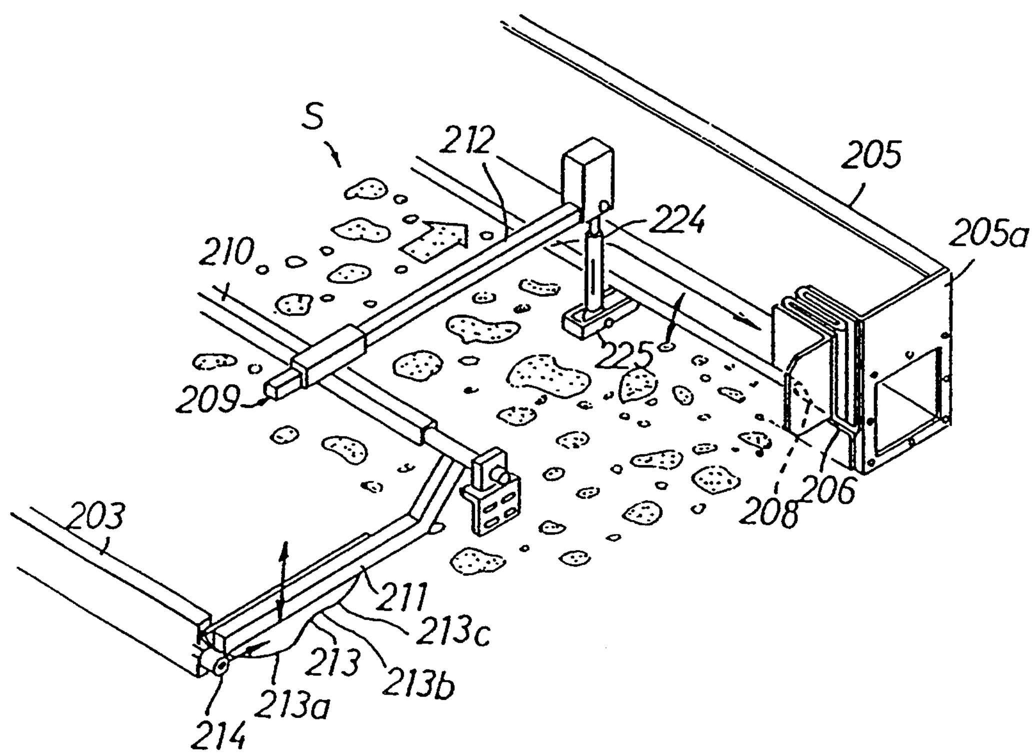
FIG. 27 is a perspective view showing the actuating mechanism employed in the conventional scum removal apparatus.

FIG. 25 illustrates an embodiment in which the present invention is applied to a deeper pool of a two-story settling pool. Reference numerals used in this embodiment are the same as those employed in the embodiment shown in FIG. 23. Even in this embodiment, the scum removal apparatus can be manufactured compact and can easily be installed at site.

It is to be noted that the cam plate may have its surface oriented horizontally or inclined upwardly while the rollers are so arranged as to retain an operatively associated relationship therewith. Conversely, the cam plate may be provided on the flights while the rollers may be provided on the rotary shaft.

INDUSTRIAL APPLICABILITY

As hereinbefore fully described, the scum removal apparatus according to the present invention is installed at a treatment pool such as the starting or final settling pool, is useful as a convenient apparatus for removing scum afloat on a water surface, is applicable to all apparatuses designed to remove scum by the maximized utilization of the power delivered by movable members existing in the treatment pool, and can particularly be manufactured compact in size, at a reduced cost and to meet a requirement that it can be installed at site.

What is claimed is:

1. A scum removal apparatus for a treatment pool comprising;

a trough opening upwardly and frontwardly, said trough including means for fixedly supporting the trough adjacent a water surface in the treatment pool with the frontwardly oriented opening of said trough positioned below a water surface of the treatment pool, at least one movable element for location in the treatment pool;

a weir located adjacent the trough including means for selectively floating above and sinking below the water surface for drawing close towards the trough and damming scum floating on the water surface, respectively, an actuating mechanism including means for being repeatedly driven in response to movement and contact with the movable element within the treatment pool, a transmission mechanism operatively connected to the actuating mechanism for driving the weir in response to the drive of the actuating mechanism, said transmission means including a hydraulic pump including means for being driven by said actuating mechanism, a hydraulic drive machine for driving the weir, and a control valve for selectively switching the hydraulic drive machine in one of first and second directions as a result of being switched by the actuating mechanism, so that said actuating mechanism drives the hydraulic pump and also switches the control valve so that the hydraulic drive machine can be driven in one of two directions opposite to each other to cause the weir to selectively float above and sink below the water surface.

2. The scum removal apparatus as claimed in claim 1, wherein there are two physically distinct actuating mechanisms each mechanism including a shaft operatively connected to a plurality of levers by a link chain operatively connected to each lever.

3. The scum removal apparatus according to claims 2, wherein there are support frames for pivotally moving the levers.

4. The scum removal apparatus according to claim 1, wherein the movable element includes a shoe, chain bracket and a roller at one end.

5. A scum removal apparatus for a treatment pool comprising:

a trough opening upwardly and frontwardly, said through including means for fixedly supporting the trough adjacent a water surface in the treatment pool with the frontwardly oriented opening of said trough positioned below the water surface, at least one movable element for location in the treatment pool, a weir located adjacent the trough including means for selectively floating above and sinking below the water surface for drawing close towards the trough and damming scum floating on the water surface, respectively, an actuating mechanism including means for being repeatedly driven in response to movement and contact with the movable element within the treatment pool, a transmission mechanism operatively connected to the actuating mechanism for driving the weir in response to the drive of the actuating mechanism, said actuating mechanism including a plurality of cam means each having a series of projections and recesses alternating with each other and a member operatively connected with the cam means, said cam means being arranged along a path through which said movable element moves, a rotary shaft which is rotatable about an axis aligned with the direction of movement of the movable element and is rotatable by movement of the movable element, and said member being rotatable around the rotary shaft.

6. A scum removal apparatus as claimed in claim 5, wherein said transmission means is a mechanical transmission mechanism including the rotary shaft.

7. A scum removal apparatus as claimed in claim 5, wherein said transmission mechanism is a device operable by hydraulic pressure.

* * * * *